(12) United States Patent
Tamaoka et al.

(10) Patent No.: US 9,360,019 B2
(45) Date of Patent: Jun. 7, 2016

(54) FAN

(71) Applicant: NIDEC CORPORATION, Kyoto (JP)

(72) Inventors: Takehito Tamaoka, Kyoto (JP); Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 77 days.

(21) Appl. No.: 14/498,551

(22) Filed: Sep. 26, 2014

(65) Prior Publication Data

US 2015/0198166 A1    Jul. 16, 2015

(30) Foreign Application Priority Data

Jan. 14, 2014    (JP) .................................. 2014-004556
Jul. 1, 2014    (JP) ................................. 2014-136254

(51) Int. Cl.
| | | |
|---|---|---|
| G06F 1/20 | (2006.01) | |
| H05K 5/00 | (2006.01) | |
| H05K 7/20 | (2006.01) | |
| F04D 25/06 | (2006.01) | |
| F04D 29/051 | (2006.01) | |
| F04D 29/58 | (2006.01) | |
| F04D 17/16 | (2006.01) | |
| F04D 29/057 | (2006.01) | |

(52) U.S. Cl.
CPC .............. *F04D 25/062* (2013.01); *F04D 17/16* (2013.01); *F04D 25/0626* (2013.01); *F04D 29/057* (2013.01); *F04D 29/0513* (2013.01); *F04D 29/5853* (2013.01); *G06F 1/203* (2013.01)

(58) Field of Classification Search
CPC ... F04D 17/16; F04D 25/062; F04D 25/0626; F04D 29/0513; F04D 29/057; F04D 29/5853; G06F 1/203

USPC .................... 361/679.46–679.54, 688–723; 417/350–354, 423.12, 423.14
See application file for complete search history.

(56) References Cited

U.S. PATENT DOCUMENTS

2002/0057022 A1    5/2002    Yamamoto
2004/0114327 A1    6/2004    Sri-Jayantha et al.
(Continued)

FOREIGN PATENT DOCUMENTS

CN    101217859 A    7/2008
CN    102112939 A    6/2011
(Continued)

OTHER PUBLICATIONS

Tamaoka et al., "Cooling Apparatus"; U.S. Appl. No. 14/483,843, filed Sep. 11, 2014.
(Continued)

*Primary Examiner* — Anthony Haughton
*Assistant Examiner* — Yahya Ahmad
(74) *Attorney, Agent, or Firm* — Westerman, Hattori, Daniels & Adrian, LLP

(57) ABSTRACT

A blower fan includes a heat source contact portion. A side wall portion includes a tongue portion. In a plan view, The heat source contact portion is arranged to cover a portion of a region surrounded by a third imaginary straight line tangent to an outer circumferential surface of a blade support portion and extending in parallel with the second imaginary straight line toward the air outlet in the first region, a fourth imaginary straight line tangent to the outer circumferential surface of the blade support portion and extending in parallel with the first imaginary straight line in the third region, the outer circumferential surface of the blade support portion, and the air outlet.

19 Claims, 10 Drawing Sheets

(56) References Cited

U.S. PATENT DOCUMENTS

| | | |
|---|---|---|
| 2007/0086168 A1 | 4/2007 | Khanna et al. |
| 2007/0194668 A1* | 8/2007 | Teshima .............. F04D 25/0613 310/67 R |
| 2008/0159853 A1 | 7/2008 | Khanna et al. |
| 2008/0180914 A1 | 7/2008 | Khanna et al. |
| 2008/0219838 A1* | 9/2008 | Kusano .................... F01D 1/02 415/203 |
| 2008/0225488 A1 | 9/2008 | Khanna et al. |
| 2009/0174050 A1 | 7/2009 | Bernstein et al. |
| 2009/0199997 A1 | 8/2009 | Koplow |
| 2010/0177480 A1 | 7/2010 | Koplow |
| 2011/0103011 A1 | 5/2011 | Koplow |
| 2011/0123318 A1 | 5/2011 | Khanna et al. |
| 2012/0180992 A1 | 7/2012 | Koplow |
| 2013/0164158 A1* | 6/2013 | Matsuba ................ F04D 17/16 417/410.1 |
| 2015/0110649 A1* | 4/2015 | Tamaoka ................ F04D 17/16 417/354 |
| 2015/0198176 A1* | 7/2015 | Tamaoka ............ F04D 29/5853 361/679.49 |
| 2016/0003261 A1* | 1/2016 | Tamaoka .............. F04D 19/002 415/177 |

FOREIGN PATENT DOCUMENTS

| | | |
|---|---|---|
| EP | 2329337 A1 | 6/2011 |
| JP | 2000-238089 A | 10/2000 |
| JP | 2001-057493 A | 2/2001 |
| JP | 2001-111277 A | 4/2001 |
| JP | 2011-530191 A | 12/2011 |
| WO | 2010/016963 A1 | 2/2010 |

OTHER PUBLICATIONS

Tamaoka et al., "Fan", U.S. Appl. No. 14/499,680, filed Sep. 29, 2014.

* cited by examiner

FAN

BACKGROUND OF THE INVENTION

1. Field of the Invention

The present invention relates to a blower fan.

2. Description of the Related Art

Electronic devices, such as notebook PCs, produce a large amount of heat at CPUs and the like inside cases thereof. This makes it important to take measures against the heat. One common measure against the heat is to install blower fans inside the cases to discharge the heat.

In recent years, electronic devices have been becoming more and more sophisticated in functionality, accompanied by a considerable increase in the temperature inside the electronic devices. Accordingly, there is a demand for a blower fan which is excellent in cooling capability, with the view of cooling an interior of such an electronic device. A fan unit disclosed in JP-A 2001-111277 is arranged to discharge an air through an air outlet arranged radially outside blades so that the air can be blown to a heat-radiating component mounted on a circuit board arranged radially outside the blades. The heat-radiating component is thus directly cooled.

However, in recent years, electronic devices have been becoming more and more densely packed with electronic components, and heat may not be sufficiently discharged out of such a recent electronic device only by blowing an air to a heat source.

SUMMARY OF THE INVENTION

A blower fan according to a preferred embodiment of the present invention includes an impeller, a motor portion, and a housing. The impeller includes a plurality of blades and a blade support portion. The blades are arranged to rotate about a central axis extending in a vertical direction, and are arranged in a circumferential direction. The blade support portion is annular and is arranged to support the blades. The motor portion is arranged to rotate the impeller. The housing is arranged to contain the impeller. The housing includes a lower plate portion, a side wall portion, and an upper plate portion. The lower plate portion is arranged to cover a lower side of the impeller, and is arranged to support the motor portion. The side wall portion is arranged to cover a lateral side of the impeller, and includes at least one opening each of which opens into an exterior space outside the blower fan, each of the at least one opening extending over a circumferential extent. The upper plate portion is arranged to cover an upper side of the impeller, and includes an air inlet. The upper plate portion, the side wall portion, and the lower plate portion are arranged to together define an air outlet on the lateral side of the impeller. A space joining a space above the impeller and a space between the impeller and the lower plate portion to each other in an axial direction is defined between adjacent ones of the blades of the impeller. The blower fan further includes a heat source contact portion with which a heat source is to be in contact, the heat source contact portion being arranged in a surface of the blower fan which faces away from the impeller. The air outlet is a plane parallel to the central axis, and including one of an edge of the upper plate portion, a pair of edges which are circumferential ends of the opening of the side wall portion, and an edge of the lower plate portion that is the closest to the central axis. The side wall portion includes a tongue portion arranged to project between the air outlet and the impeller. An imaginary straight line which is parallel to the air outlet and which intersects with the central axis in a plan view is defined as a first imaginary straight line. An imaginary straight line which is perpendicular to the air outlet and which intersects with the central axis in the plan view is defined as a second imaginary straight line. Of four regions divided by the first and second imaginary straight lines, a region in which the tongue portion is arranged is defined as a first region, and the three other regions are defined as a second region, a third region, and a fourth region in an order in which the three regions are arranged in a rotation direction of the impeller from the first region. An imaginary straight line which is tangent to an outer circumferential surface of the blade support portion and which extends in parallel with the second imaginary straight line toward the air outlet in the first region is defined as a third imaginary straight line. An imaginary straight line which is tangent to the outer circumferential surface of the blade support portion and which extends in parallel with the first imaginary straight line in the third region is defined as a fourth imaginary straight line. At least a portion of the air outlet is arranged in the fourth region. The heat source contact portion is arranged to cover a portion of a region surrounded by the third imaginary straight line, the fourth imaginary straight line, the outer circumferential surface of the blade support portion, and the air outlet.

The present invention is able to provide a blower fan which is capable of efficiently cooling a heat source.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
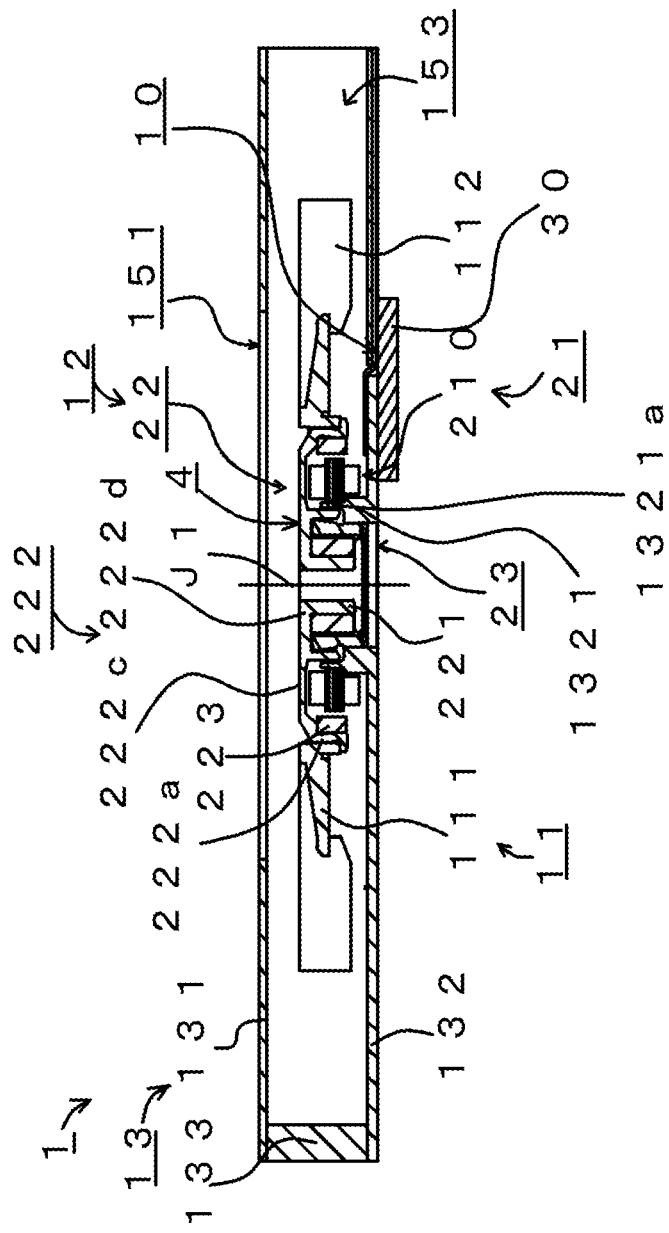
FIG. 1 is a cross-sectional view of a blower fan according to a first preferred embodiment of the present invention.

It is assumed herein that a vertical direction is defined as a direction in which a central axis of a motor portion extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor portion is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a cross-sectional view of a blower fan 1 according to a first preferred embodiment of the present invention. The blower fan 1 according to the present preferred embodiment is a centrifugal fan, and is used, for example, in a notebook personal computer in which a heat source 30, i.e., a CPU or another electronic component which is another heat-radiating component, is arranged directly on the blower fan 1 to cool the CPU or the other electronic component. The blower fan 1 includes an impeller 11, a motor portion 12, and a housing 13. The impeller 11 is arranged to extend radially outward from a rotating portion 22 of the motor portion 12. The impeller 11 is caused by the motor portion 12 to rotate about a central axis J1.

The impeller 11 is made of a resin having excellent thermal conductivity (hereinafter referred to as a "heat conductive resin"), and includes a plurality of blades 112 arranged in a circumferential direction, and a substantially annular blade support portion 111 arranged to support the blades 112. An inner circumferential surface of the blade support portion 111 is fixed to the rotating portion 22 of the motor portion 12. The blades 112 are arranged to extend radially outward from an outer circumferential surface of the blade support portion 111 with the central axis J1 as a center. The blade support portion 111 and the blades 112 are defined as a single continuous member by a resin injection molding process. Note that the impeller 11 may be made of aluminum. A heat in the heat source 30 is transferred to the impeller 11 through the housing 13 and the motor portion 12. Rotation of the impeller 11 enables dissipation of the heat. In the case where the impeller 11 is made of the heat conductive resin, the impeller 11 is capable of rotating at a higher speed, since the heat conductive resin has a specific gravity smaller than that of aluminum. Air volume is thereby increased, and an improvement in cooling performance is achieved. The heat conductive resin is preferably a resin including a metal filler, and in this case, a further improvement in the cooling performance is achieved. Note that the impeller 11 is preferably arranged to have a thermal conductivity of 1.0 W/(m·K) or more. More preferably, the impeller 11 is arranged to have a thermal conductivity of 3.0 W/(m·K) or more.

The blower fan 1 is arranged to produce air currents through the rotation of the impeller 11 about the central axis J1 caused by the motor portion 12.

The housing 13 is arranged to contain the motor portion 12 and the impeller 11. The housing 13 includes an upper plate portion 131, a mounting plate 132 (hereinafter referred to as a lower plate portion 132), and a side wall portion 133. The upper plate portion 131 is a substantially plate-shaped member made of a metal. The upper plate portion 131 is arranged above the motor portion 12 and the impeller 11 to cover an upper side of the impeller 11. The upper plate portion 131 includes one air inlet 151 arranged to pass therethrough in a vertical direction. The air inlet 151 is arranged to axially overlap with at least a portion of the impeller 11 and the entire motor portion 12. The air inlet 151 is substantially circular, and the central axis J1 passes therethrough. At least one pair of adjacent ones of the blades 112 are arranged to define a channel therebetween, the channel joining a space axially above the blades 112 and a space between the blades 112 and the lower plate portion 132 to each other in an axial direction.

The channel is arranged to be open toward an upper surface of the lower plate portion 132. Thus, an air sucked through the air inlet 151 passes between the adjacent blades 112 of the impeller 11 toward the lower plate portion 132. The lower plate portion 132 and the heat source 30 are in thermal contact with each other. The thermal contact between the lower plate portion 132 and the heat source 30 enables a heat to be transferred from the heat source 30 to the lower plate portion 132. That is, since the air sucked through the air inlet 151 passes between the adjacent blades 112 of the impeller 11 toward the lower plate portion 132, a wind strikes the lower plate portion 132 to achieve an improvement in the cooling performance.

The lower plate portion 132 is a substantially plate-shaped member produced by subjecting a metal sheet to press working. The lower plate portion 132 is arranged below the motor portion 12 and the impeller 11 to support the motor portion 12. According to the present preferred embodiment, the lower plate portion 132 is made of aluminum. In this case, the heat can be dissipated through the lower plate portion 132. Note that a material of the lower plate portion 132 may be copper, an aluminum alloy, iron, an iron-base alloy (including SUS), or a heat conductive resin.

The blower fan 1 includes, in a surface thereof facing away from the impeller 11, a heat source contact portion 10 with which the heat source 30 is to be in contact. The heat source 30 is the CPU or the other electronic component which is the other heat-radiating component. According to the present preferred embodiment, an upper surface of the heat source 30 is arranged to be in thermal contact with a lower surface of the lower plate portion 132. The heat source 30 and the lower plate portion 132 are arranged to be in close contact with each other with a heat-conducting member, such as grease or a thermal sheet which is a portion of the heat source 30, arranged therebetween, and this heat-conducting member causes the heat source 30 and the lower surface of the lower plate portion 132 to be in thermal contact with each other. Note that the heat source contact portion 10 may be arranged at a location different from the lower plate portion 132, as described below.

The side wall portion 133 is made of a resin. The side wall portion 133 is arranged to cover a lateral side of the impeller 11. That is, the side wall portion 133 is arranged radially outside the blades 112 to surround the blades 112. The upper plate portion 131 is fixed to an upper end portion of the side wall portion 133 through screws or by another fixing method. A lower end portion of the side wall portion 133 is joined to the lower plate portion 132 by an insert molding process. The side wall portion 133 is arranged substantially in the shape of the letter "U" when viewed in a direction parallel to the central axis J1, and includes an air outlet 153 which opens radially outward. In more detail, portions of the upper and lower plate portions 131 and 132 are arranged on an upper side and a lower side, respectively, of an opening of the side wall portion 133. The air outlet 153 is a plane parallel to the central axis J1 and including one of an edge of the upper plate portion 131, a pair of edges which are circumferential ends of the opening of the side wall portion 133, and an edge of the lower plate portion 132 that is the closest to the central axis J1. According to the present preferred embodiment, an area enclosed by the upper and lower plate portions 131 and 132 and the opening of the side wall portion 133 is the air outlet 153. Note that the side wall portion 133 may not necessarily be provided by the insert molding process. Also note that the side wall portion 133 may not necessarily be made of the resin. Also note that each of the upper and lower plate portions 131 and 132 may be fixed to the side wall portion 133 by a fixing method not mentioned above.

Figure 2:
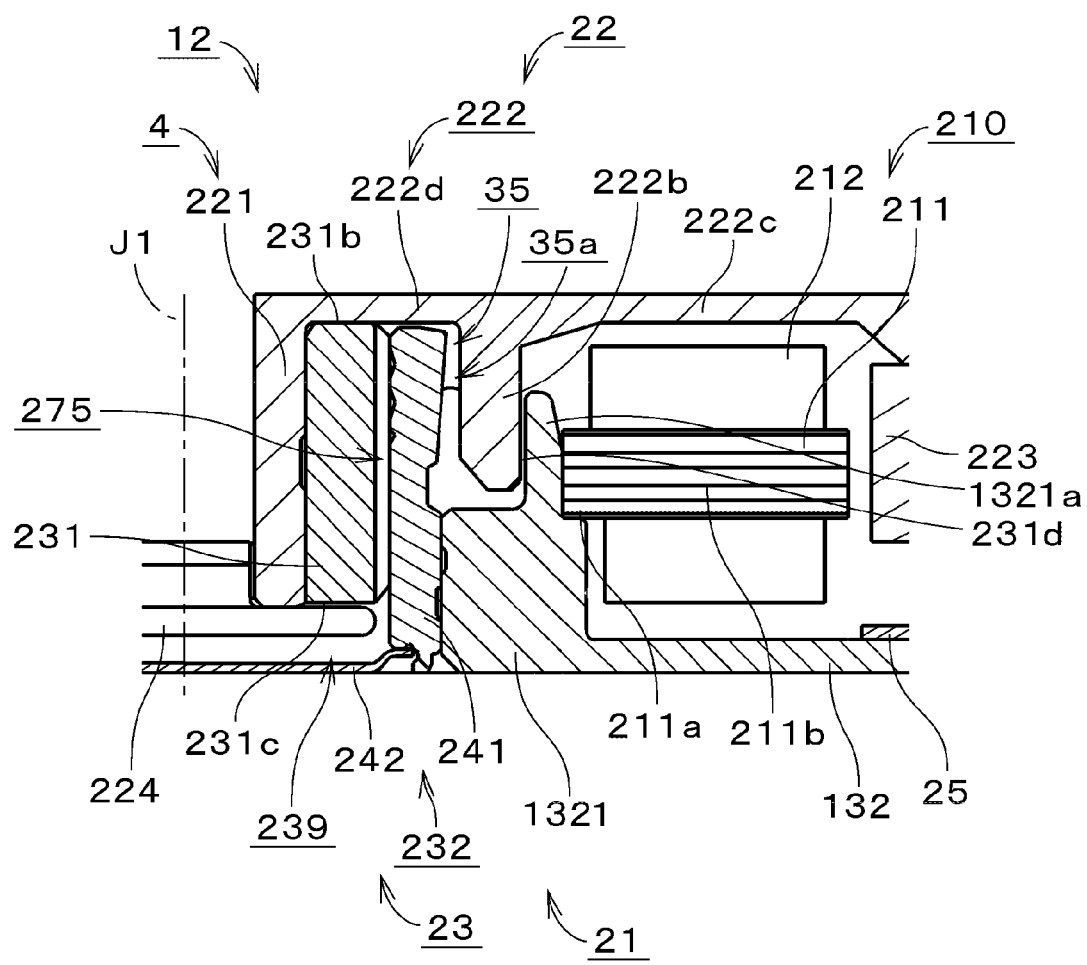
FIG. 2 is a cross-sectional view of a motor portion and its vicinity according to the first preferred embodiment.

FIG. 2 is a cross-sectional view of the motor portion 12 and its vicinity. The motor portion 12 is of an outer-rotor type. The motor portion 12 includes a stationary portion 21 and the rotating portion 22. The stationary portion 21 includes a bearing portion 23, the lower plate portion 132, a stator 210, and a circuit board 25.

The bearing portion 23 is arranged radially inward of the stator 210. The bearing portion 23 includes a sleeve 231 and a bearing housing 232. The sleeve 231 is substantially cylindrical in shape and centered on the central axis J1. The sleeve 231 is a metallic sintered body. The sleeve 231 is impregnated with a lubricating oil. A plurality of circulation grooves 275, each of which is arranged to extend in the axial direction and through each of which the lubricating oil circulates, are defined in an outer circumferential surface of the sleeve 231. The circulation grooves 275 are arranged at regular intervals in the circumferential direction. The bearing housing 232 is substantially cylindrical and has a bottom, and includes a housing cylindrical portion 241 and a cap 242. The housing cylindrical portion 241 is substantially cylindrical in shape and centered on the central axis J1, and is arranged to cover the outer circumferential surface of the sleeve 231. The sleeve 231 is fixed to an inner circumferential surface of the housing cylindrical portion 241 through an adhesive. The bearing housing 232 is made of a metal. The cap 242 is fixed to a lower end portion of the housing cylindrical portion 241. The cap 242 is arranged to close a bottom portion of the housing cylindrical portion 241. Note that use of the adhesive to fix the sleeve 231 to the inner circumferential surface of the housing cylindrical portion 241 is not essential to the present invention. For example, the sleeve 231 may be fixed to the inner circumferential surface of the housing cylindrical portion 241 through press fit. Note that each of the sleeve 231, the bearing housing 232, and the cap 242 may be made of a nonmetallic material having excellent thermal conductivity. For example, each of the sleeve 231, the bearing housing 232, and the cap 242 may be made of a heat conductive resin or brass.

The lower plate portion 132 includes a rising portion 1321 in a radially inner portion thereof. The rising portion 1321 is a substantially annular portion. A lower region of an outer circumferential surface of the housing cylindrical portion 241, i.e., a lower region of an outer circumferential surface of the bearing housing 232, is fixed to an inner circumferential surface of the rising portion 1321 through adhesion or press fit. Note that both adhesion and press fit may be used to fix the bearing housing 232 and the rising portion 1321 to each other.

The stator 210 is a substantially annular member centered on the central axis J1. The stator 210 includes a stator core 211 and a plurality of coils 212 arranged on the stator core 211. The stator core 211 is defined by laminated silicon steel sheets, each of which is in the shape of a thin sheet. The stator core 211 includes a substantially annular core back 211a and a plurality of teeth 211b arranged to project radially outward from the core back 211a. A conducting wire is wound around each of the teeth 211b to define the coils 212. The circuit board 25 is arranged below the stator 210. Lead wires of the coils 212 are electrically connected to the circuit board 25. The circuit board 25 is a flexible printed circuit (FPC) board.

The rotating portion 22 includes a shaft 221, a thrust plate 224, a rotor holder 222, and a rotor magnet 223. The shaft 221 is arranged to have the central axis J1 as a center thereof.

Referring to FIG. 1, the rotor holder 222 is arranged substantially in the shape of a covered cylinder and centered on the central axis J1. The rotor holder 222 includes a tubular "cylindrical magnet holding portion" 222a, a cover portion 222c, and a first thrust portion 222d. The cylindrical magnet holding portion 222a, the cover portion 222c, and the first thrust portion 222d are defined integrally with one another. The first thrust portion 222d is arranged to extend radially outward from an upper end portion of the shaft 221. The cover portion 222c is arranged to extend radially outward from the first thrust portion 222d. The upper plate portion 131 is arranged above the cover portion 222c and the first thrust portion 222d. A lower surface of the cover portion 222c is a substantially annular surface arranged around the shaft 221. Referring to FIG. 2, the first thrust portion 222d is arranged axially opposite each of an upper surface 231b of the sleeve 231 and an upper surface of the housing cylindrical portion 241.

The thrust plate 224 includes a substantially disk-shaped portion arranged to extend radially outward. The thrust plate 224 is fixed to a lower end portion of the shaft 221, and is arranged to extend radially outward from the lower end portion thereof. The thrust plate 224 is accommodated in a plate accommodating portion 239 defined by a lower surface 231c of the sleeve 231, an upper surface of the cap 242, and a lower portion of the inner circumferential surface of the housing cylindrical portion 241. An upper surface of the thrust plate 224 is a substantially annular surface arranged around the shaft 221. The upper surface of the thrust plate 224 is arranged axially opposite the lower surface 231c of the sleeve 231, i.e., a downward facing surface in the plate accommodating portion 239. Hereinafter, the thrust plate 224 will be referred to as a "second thrust portion 224". A lower surface of the second thrust portion 224 is arranged opposite to the upper surface of the cap 242 of the bearing housing 232. The shaft 221 is inserted in the sleeve 231. Note that the thrust plate 224 may be defined integrally with the shaft 221. The thrust plate 224 is made, for example, of a metal, such as stainless steel.

The shaft 221 is defined integrally with the rotor holder 222. The shaft 221 and the rotor holder 222 are produced by subjecting a metallic member to a cutting process. That is, the cover portion 222c and the shaft 221 are continuous with each other. Note that the shaft 221 may be defined by a member separate from the rotor holder 222. In this case, the upper end portion of the shaft 221 is fixed to the cover portion 222c of the rotor holder 222. Referring to FIG. 1, the rotor magnet 223 is fixed to an inner circumferential surface of the cylindrical magnet holding portion 222a, which is arranged to extend axially downward from a radially outer end portion of the cover portion 222c of the rotor holder 222. The shaft 221 is made, for example, of a metal, such as stainless steel.

Referring to FIG. 2, the rotor holder 222 further includes a substantially annular "annular tubular portion" 222b arranged to extend downward from an outer edge portion of the first thrust portion 222d. The annular tubular portion 222b will be hereinafter referred to as a "rotor cylindrical portion 222b". The rotor cylindrical portion 222b of the rotor holder 222 is arranged radially inward of the stator 210. The rotor cylindrical portion 222b is arranged radially outward of the bearing housing 232. An inner circumferential surface of the rotor cylindrical portion 222b is arranged radially opposite an outer circumferential surface of an upper portion of the housing cylindrical portion 241. A seal gap 35 is defined between the inner circumferential surface of the rotor cylindrical portion 222b and the outer circumferential surface of the housing cylindrical portion 241. A seal portion 35a having a surface of the lubricating oil defined therein is defined in the seal gap 35.

Referring to FIG. 1, the inner circumferential surface of the blade support portion 111 is fixed to an outer circumferential surface of the cylindrical magnet holding portion 222a of the rotor holder 222. The blades 112 are arranged outside the outer circumferential surface of the cylindrical magnet holding portion 222a. The upper end portion of the shaft 221 is fixed to the impeller 11 through the rotor holder 222. Note that the impeller 11 may be defined integrally with the rotor holder 222. In this case, the upper end portion of the shaft 221 is fixed to the impeller 11 in a direct manner.

The rotor magnet 223 is substantially cylindrical in shape and centered on the central axis J1. As described above, the rotor magnet 223 is fixed to the inner circumferential surface of the cylindrical magnet holding portion 222a. The rotor magnet 223 is arranged radially outside the stator 210.

Referring to FIG. 2, the rising portion 1321 includes a rising upper tubular portion 1321a arranged to project upward at an upper end thereof. An outer circumferential surface of the rotor cylindrical portion 222b is arranged opposite to an inner circumferential surface of the rising upper tubular portion 1321a with a radial gap (hereinafter referred to as a minute gap 231d) intervening therebetween. Entrance and exit of a gas through this minute gap 231d are limited. This contributes to reducing evaporation of the lubricating oil through the seal portion 35a. The radial width of the minute gap 231d is arranged to be 0.15 mm or less than 0.15 mm. More preferably, the radial width of the minute gap 231d is arranged to be 0.10 mm or less than 0.10 mm.

Figure 3:
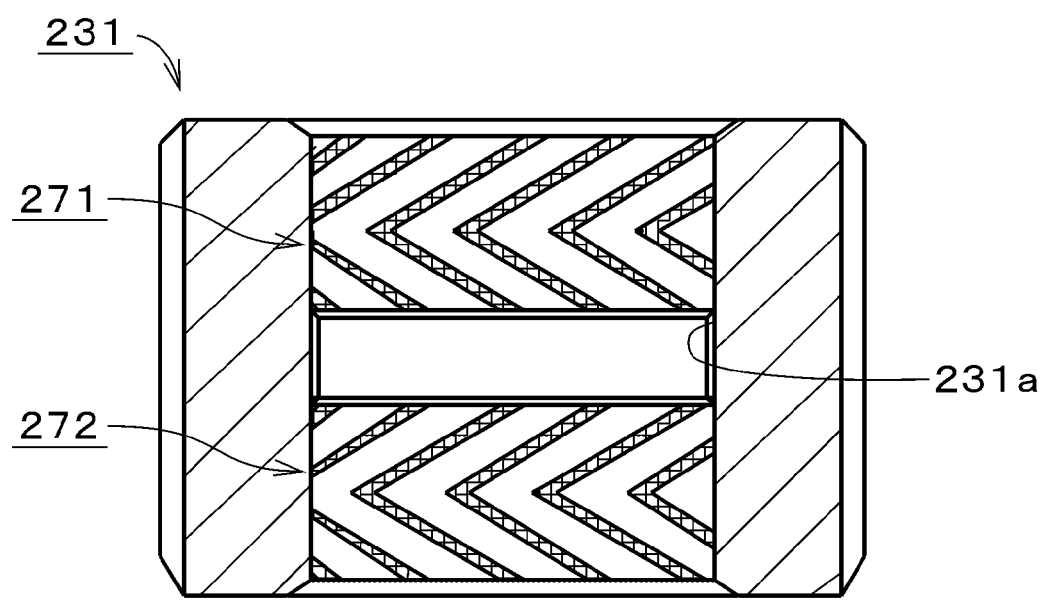
FIG. 3 is a cross-sectional view of a sleeve according to the first preferred embodiment.
Figure 4:
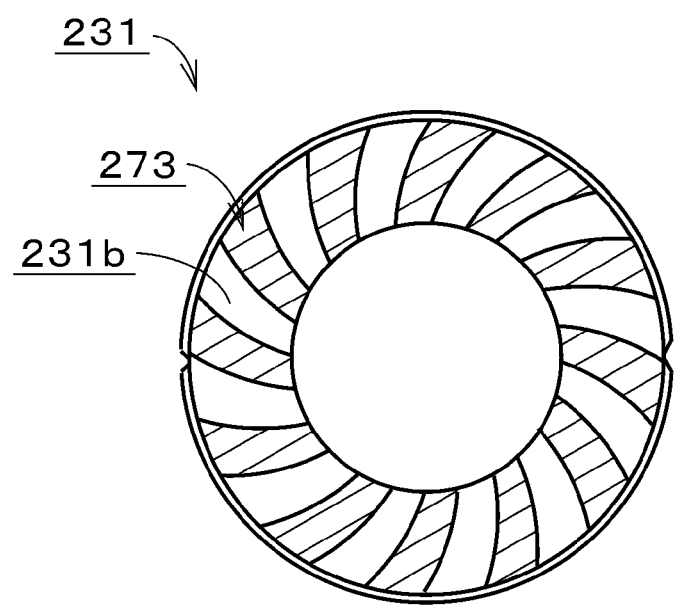
FIG. 4 is a plan view of the sleeve.
Figure 5:
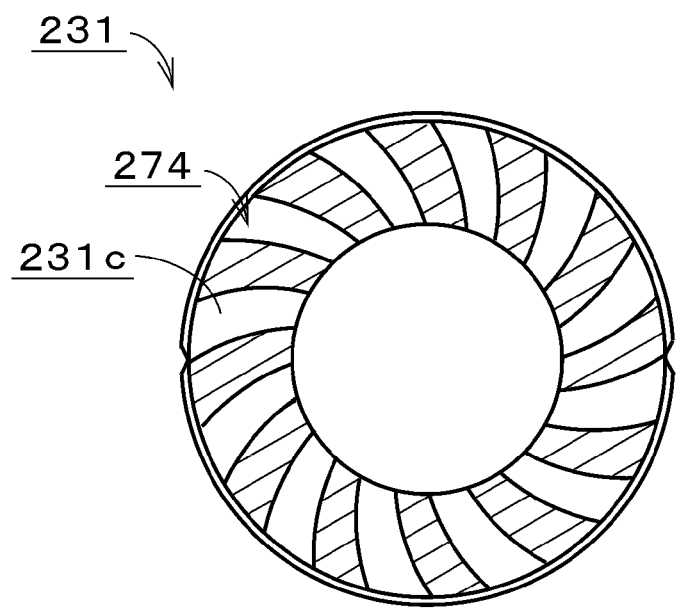
FIG. 5 is a bottom view of the sleeve.

FIG. 3 is a cross-sectional view of the sleeve 231. A first radial dynamic pressure groove array 271 and a second radial dynamic pressure groove array 272 are defined in an upper portion and a lower portion, respectively, of an inner circumferential surface 231a of the sleeve 231. Each of the first and second radial dynamic pressure groove arrays 271 and 272 is made up of a plurality of grooves arranged in a herringbone pattern. FIG. 4 is a plan view of the sleeve 231. A first thrust dynamic pressure groove array 273 is defined in the upper surface 231b of the sleeve 231. The first thrust dynamic pressure groove array 273 is made up of a plurality of grooves arranged in a spiral pattern. FIG. 5 is a bottom view of the sleeve 231. A second thrust dynamic pressure groove array 274 is defined in the lower surface 231c of the sleeve 231. The second thrust dynamic pressure groove array 274 is made up of a plurality of grooves arranged in the spiral pattern.

Figure 6:
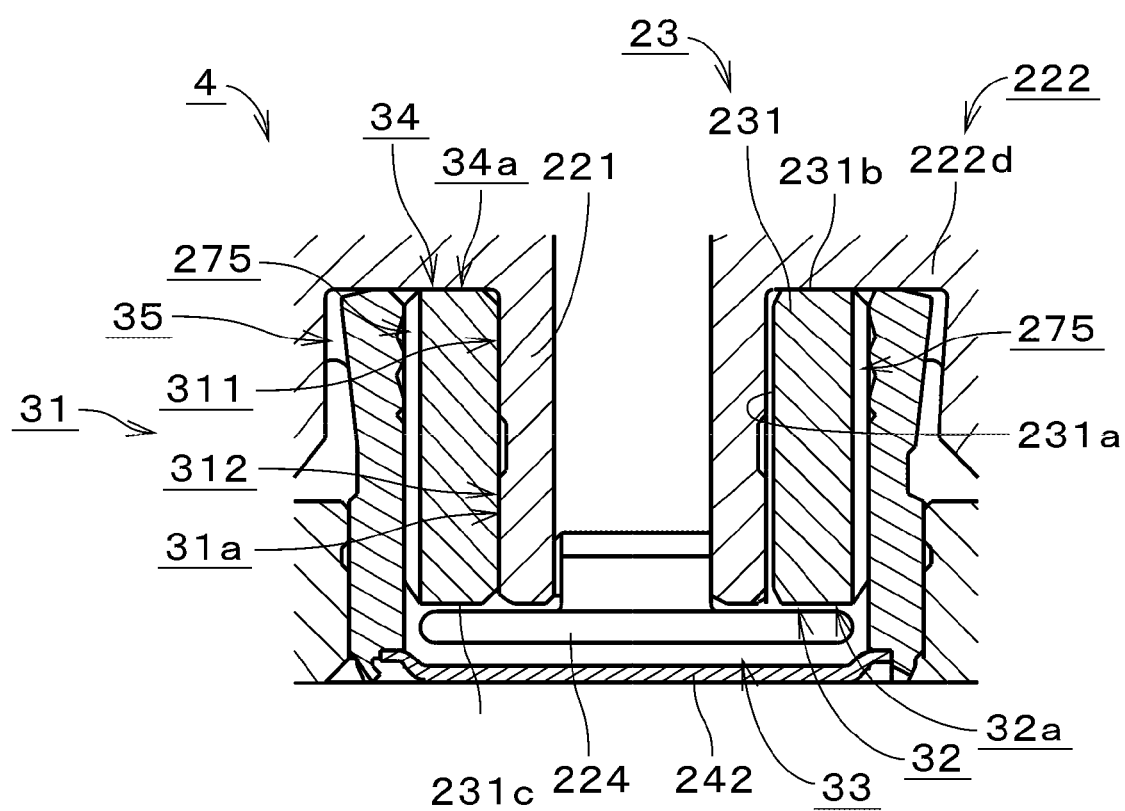
FIG. 6 is a cross-sectional view of a bearing portion and its vicinity according to the first preferred embodiment.

FIG. 6 is a cross-sectional view of the bearing portion 23 and its vicinity. A radial gap 31 is defined between an outer circumferential surface of the shaft 221 and the inner circumferential surface 231a of the sleeve 231. The radial gap 31 includes a first radial gap 311 and a second radial gap 312, which is arranged on a lower side of the first radial gap 311. The first radial gap 311 is defined between the outer circumferential surface of the shaft 221 and a portion of the inner circumferential surface 231a of the sleeve 231 in which the first radial dynamic pressure groove array 271 illustrated in FIG. 3 is defined. The lubricating oil is arranged in the first radial gap 311. The second radial gap 312 is defined between the outer circumferential surface of the shaft 221 and a portion of the inner circumferential surface 231a of the sleeve 231 in which the second radial dynamic pressure groove array 272 illustrated in FIG. 3 is defined. The lubricating oil is arranged in the second radial gap 312. The first and second radial gaps 311 and 312 are arranged to together define a radial dynamic pressure bearing portion 31a arranged to produce a fluid dynamic pressure in the lubricating oil. The shaft 221 is supported in a radial direction by the radial dynamic pressure bearing portion 31a. The radial width of the radial gap 31 is arranged to be 5 μm or less than 5 μm. More preferably, the radial width of the radial gap 31 is arranged to be 3 μm or less than 3 μm.

A thrust portion (not shown) includes the first thrust portion 222d, which is an upper thrust portion, and the second thrust portion 224, which is a lower thrust portion. A first thrust gap 34 is defined between a portion of the upper surface 231b of the sleeve 231 in which the first thrust dynamic pressure groove array 273 is defined and a lower surface of the first thrust portion 222d. The lubricating oil is arranged in the first thrust gap 34. The first thrust gap 34 is arranged to define an upper thrust dynamic pressure bearing portion 34a arranged to produce a fluid dynamic pressure in the lubricating oil. The first thrust portion 222d is supported in the axial direction by the upper thrust dynamic pressure bearing portion 34a. The axial width of the first thrust gap 34 is arranged to be 70 μm or less than 70 μm. More preferably, the axial width of the first thrust gap 34 is arranged to be 45 μm or less than 45 μm.

A second thrust gap 32 is defined between a portion of the lower surface 231c of the sleeve 231 in which the second thrust dynamic pressure groove array 274 is defined and the upper surface of the second thrust portion 224. The lubricating oil is arranged in the second thrust gap 32. The second thrust gap 32 is arranged to define a lower thrust dynamic pressure bearing portion 32a arranged to produce a fluid dynamic pressure in the lubricating oil. The second thrust portion 224 is supported in the axial direction by the lower thrust dynamic pressure bearing portion 32a. The upper and lower thrust dynamic pressure bearing portions 34a and 32a are arranged to be in communication with each other through the circulation grooves 275.

A third thrust gap 33 is defined between the upper surface of the cap 242 of the bearing housing 232 and the lower surface of the second thrust portion 224. The third thrust gap 33 may be arranged to produce a fluid dynamic pressure in the lubricating oil between the upper surface of the cap 242 and the lower surface of the second thrust portion 224.

In the motor portion 12, the seal gap 35, the first thrust gap 34, the radial gap 31, the second thrust gap 32, and the third thrust gap 33 are arranged to together define a single continuous bladder structure, and the lubricating oil is arranged continuously in this bladder structure. Within the bladder structure, a surface of the lubricating oil is defined only in the seal gap 35.

Referring to FIG. 2, in the motor portion 12, the shaft 221, the first thrust portion 222d, the rotor cylindrical portion 222b, which is arranged to extend downward from the outer edge portion of the first thrust portion 222d, the second thrust portion 224, the bearing portion 23, the rising portion 1321, and the lubricating oil are arranged to together define a bearing mechanism 4, which is a bearing apparatus. Hereinafter, each of the shaft 221, the first thrust portion 222d, the rotor cylindrical portion 222b, the second thrust portion 224, the bearing portion 23, and the rising portion 1321 will be referred to as a portion of the bearing mechanism 4. In the bearing mechanism 4, the shaft 221, the first thrust portion 222d, and the second thrust portion 224 are arranged to rotate relative to the bearing portion 23 with the lubricating oil intervening therebetween.

In the motor portion 12, once power is supplied to the stator 210, a torque centered on the central axis J1 is produced between the rotor magnet 223 and the stator 210. The rotating portion 22 and the impeller 11 are supported through the bearing mechanism 4 illustrated in FIG. 1 such that the rotating portion 22 and the impeller 11 are rotatable about the central axis J1 with respect to the stationary portion 21. The rotation of the impeller 11 causes an air to be drawn into the housing 13 through the air inlet 151 and then sent out through the air outlet 153.

Figure 7:
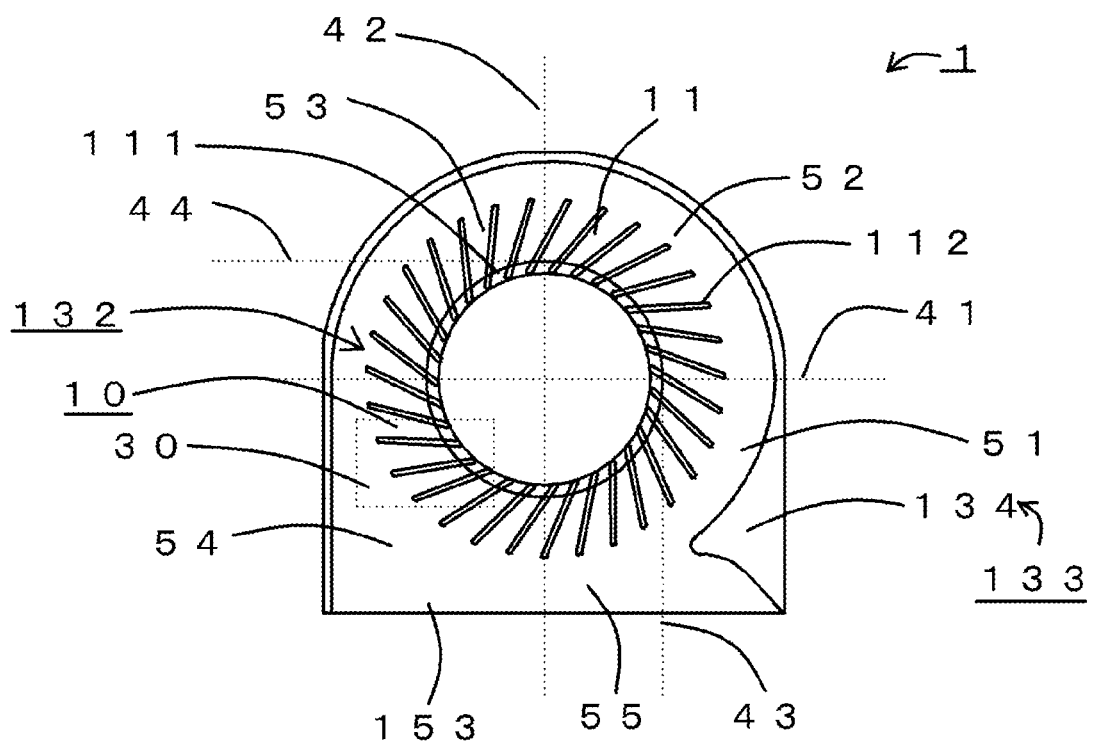
FIG. 7 is a top view of the blower fan with an upper plate portion removed therefrom.

FIG. 7 is a top view of the blower fan 1 with the upper plate portion 131 removed therefrom. The side wall portion 133 includes a tongue portion 134 arranged to project between the air outlet 153 and the impeller 11. In a plan view, an imaginary straight line which is parallel to the air outlet 153 and which intersects with the central axis J1 is defined as a first imaginary straight line 41, and an imaginary straight line which is perpendicular to the air outlet 153 and which intersects with the central axis J1 is defined as a second imaginary straight line 42. Of four regions divided by the first and second imaginary straight lines 41 and 42, a region in which the tongue portion 134 is arranged is defined as a first region 51, and the three other regions are defined as a second region 52, a third region 53, and a fourth region 54 in an order in which the three regions are arranged in a rotation direction of the impeller 11 from the first region 51. In addition, an imaginary straight line which is tangent to the outer circumferential surface of the blade support portion 111 and which extends in parallel with the second imaginary straight line 42 toward the air outlet 153 in the first region 51 is defined as a third imaginary straight line 43. An imaginary straight line which is tangent to the outer circumferential surface of the blade support portion 111 and which extends in parallel with the first imaginary straight line 41 in the third region 53 is defined as a fourth imaginary straight line 44. At least a portion of the air outlet 153 is arranged in the fourth region 54. The heat source contact portion 10 is arranged to cover a portion of a region (hereinafter referred to as a fifth region 55) surrounded by the third imaginary straight line 43, the fourth imaginary straight line 44, the outer circumferential surface of the blade support portion 111, and the air outlet 153.

The rotation of the impeller 11 causes an air to flow downstream along the rotation direction of the impeller 11. At this time, the tongue portion 134 is at an upstream end, and the air outlet 153 is at a downstream end. That is, the temperature of the air increases from the tongue portion 134 toward the air outlet 153. This phenomenon occurs for the following reasons. A heat which has been transferred from the heat source 30 to the lower plate portion 132 is carried by an air current caused by the rotation of the impeller 11. That is, the temperature of the air current increases as the air current travels downstream along a direction of flow of the air. There are broadly two air currents. A first air current is an air current which flows in the circumferential direction from the tongue portion 134 toward the air outlet 153 as described above. A second air current is an air current which flows radially from the air inlet 151 toward the side wall portion 133 along the blades 112. The second air current causes an air to carry a heat radially outward from a radially inner position. In addition, since the circumferential velocity of each blade 112 increases with increasing distance from the central axis J1, an air current around the impeller 11 becomes fastest at a radially outer end, that is, in the vicinity of the side wall portion 133. That is, an effect of forced cooling of the lower plate portion 132 caused by the air current is greatest in the vicinity of the side wall portion 133. Moreover, heat tends to be transferred toward places of lower temperatures. Accordingly, a heat to be transferred from the heat source 30 tends to be transferred toward the vicinity of the side wall portion 133 in the lower plate portion 132. Since the lower plate portion 132 has an ability to retain heat, and the lower plate portion 132 is most excellent in a heat dissipation characteristic at a radially outer portion thereof, the heat tends to be easily spread radially outward. Further, as to the first air current, since the flow velocity of the first air current increases as the first air current travels downstream, the cooling performance is greater at the downstream end. Next, the first air current will now be described below. Regarding the centrifugal fan, as the air current travels downstream, the flow velocity of the air current increases, and the amount of heat carried thereby also increases. That is, in the vicinity of the air outlet 153, the flow velocity of the air current is highest, and high performance in dissipation of heat from the lower plate portion 132 is exhibited.

Here, since the heat source contact portion 10 is arranged in the fifth region 55, the temperature of the lower plate portion 132 is increased in the fifth region 55. Meanwhile, in an entire region outside the fifth region 55, the temperature of the lower plate portion 132 is low, and accordingly, the temperature of an air current passing therein is low. The entire region outside the fifth region 55 is an upstream region in which the tongue portion 134 is arranged, and the air current having a low temperature will pass the fifth region 55. Accordingly, arrangement of the heat source contact portion 10 in the fifth region 55 makes it possible to reduce the temperature of the air current passing the fifth region 55, and leads to an improvement in the cooling performance. In the plan view, at least a portion of the heat source contact portion 10 is arranged in a region radially inside an outer end of the blade support portion 111. That is, even in the case where the heat source 30 is arranged under a region axially below the blade support portion 111, a heat is transferred from the heat source 30 to a portion of the lower plate portion 132 in the fifth region 55 to be cooled. On the other hand, a heat which has not been dissipated in the fifth region 55 tends to be easily transferred to another region, and the cooling performance is improved as a whole. Moreover, in the plan view, at least a portion of the heat source contact portion 10 is preferably arranged in a region radially inside outer ends of the blades 112 and radially outside the outer end of the blade support portion 111. Overlapping of the blades 112 and the heat source 30 in the plan view enables an air current passing between the blades 112 to pass the heat source contact portion 10 on the lower plate portion 132. That is, the heat is transferred from the heat source 30 to the lower plate portion 132, and is directly exposed to the air current. Accordingly, the heat which has been transferred from the heat source 30 to the lower plate portion 132 is effectively discharged through the air outlet 153 by the air current which has passed between the blades 112. Moreover, in the case where the bearing portion 23 and the heat source contact portion 10 are arranged to axially overlap with each other, a heat is transferred from the heat source 30 to the bearing portion 23 as described below, and is dissipated through the impeller 11. That is, the heat source 30 is preferably arranged such that the heat is not only efficiently transferred from the heat source 30 radially outward through the lower plate portion 132, but is also transferred to the bearing portion 23.

Furthermore, the heat source contact portion 10 and the fourth region 54 are preferably arranged to at least partially overlap with each other in the plan view. The flow velocity of the first air current mentioned above increases as the first air current travels toward the air outlet 153. The higher the flow velocity is, the lower the pressure of the air becomes. More air tends to flow toward a place of lower pressure. Therefore, the air volume of the second air current is increased in the fourth region 54. Accordingly, in the fourth region 54, the air volume is large, and the amount of heat dissipated from the lower plate portion 132 is accordingly increased.

The heat source contact portion 10 is preferably arranged to overlap with the bearing portion 23 in the plan view with a portion of the heat source contact portion 10 being arranged in the fourth region 54. A heat which has been transferred from the heat source 30 to the lower plate portion 132 is transferred to the bearing portion 23, and is also easily transferred to the portion of the lower plate portion 132 in the fourth region 54, where the forced cooling is most effective, leading to an improvement in heat dissipation performance. In addition, in a situation in which at least a portion of the heat source contact portion 10 is arranged in the region radially inside the outer end of the blade support portion 111 in the plan view, the heat which has been transferred from the heat source 30 to the lower plate portion 132 is efficiently dissipated easily. In this case, the heat is easily transferred to the bearing portion 23, and a capability of the bearing portion 23 to dissipate the heat therethrough is easily made the most of. Further, a heat which is not dissipated through the bearing portion 23 is transferred to the lower plate portion 132. A region radially outside the outer circumference of the blade support portion 111 is a region in which air currents caused by the rotation of the impeller 11 flow. Accordingly, a heat which has been transferred to the lower plate portion 132 is transferred in a radial manner from the vicinity of the bearing portion 23 in the lower plate portion 132, and once the heat reaches the region radially outside the outer circumference of the blade support portion 111, dissipation of the heat starts. The amount of heat dissipated is largest in a region where the flow velocity is highest and the air volume is largest, that is, in the fourth region 54, and when the heat source contact portion 10 is arranged in this region, the heat is easily transferred in the radial manner. Accordingly, a heat all over the heat source 30 is evenly dissipated, instead of only a heat in a particular portion of the heat source 30 being dissipated.

Each of the lower plate portion 132 and the side wall portion 133 is made of a material having a thermal conductivity of 1.0 W/(m·K) or more. This enables a heat radiating from the heat source 30 to be efficiently transferred to the lower plate portion 132.

A portion of the tongue portion 134 that is the closest to the second imaginary straight line 42 is arranged on an opposite side of the third imaginary straight line 43 with respect to the second imaginary straight line 42. That is, a portion of the air outlet 153 is arranged in the first region 51, and this increases the width of the air outlet 153. Accordingly, the heat which has been transferred from the heat source 30 to the lower plate portion 132 can be cooled over a wide area of the lower plate portion 132.

Each of the impeller 11, the bearing portion 23, and the shaft 221 is made of a material having a thermal conductivity of 1.0 W/(m·K) or more. When each of the impeller 11, the bearing portion 23, and the shaft 221 is made of such a material having a high thermal conductivity, a heat in the lower plate portion 132 can be transferred to the impeller 11 through the bearing portion 23 or the shaft 221. Moreover, the rotation of the blower fan 1 causes the heat transferred to the impeller 11 to be dissipated, resulting in an improvement in the cooling performance.

The lubricating oil generally has a thermal conductivity of 1.0 W/(m·K) or less. However, since each of the radial gap 31, the thrust gap 34, and the radial gap (i.e., the minute gap) 231d has a small width, a heat can be transferred from the lower plate portion 132 to the impeller 11 through a minute gap between the rotating portion 22 and the stationary portion 21. Thus, the heat is transferred from the heat source 30 to the impeller 11, and the heat can be dissipated through the rotation of the impeller 11, resulting in an improvement in the cooling performance.

As mentioned above, the radial width of the radial gap 31 is arranged to be 5 μm or less than 5 μm. More preferably, the radial width of the radial gap 31 is arranged to be 3 μm or less than 3 μm. The small radial width of the radial gap 31 enables a heat which has been transferred from the lower plate portion 132 to be transferred to the impeller 11 through the minute gap between the shaft 221 and the bearing portion 23. Thus, the heat is transferred from the heat source 30 to the impeller 11, and the heat can be dissipated through the rotation of the impeller 11, resulting in an improvement in the cooling performance.

The radial dynamic pressure bearing portion 31a is arranged to have an axial dimension equal to or greater than half the axial dimension of a region over which the shaft 221 is arranged inside the bearing portion 23. The minute gap is defined over a large region, and this facilitates transfer of the heat from the bearing portion 23 to the shaft 221. Thus, more heat is transferred from the heat source 30 to the impeller 11, and an effect of heat dissipation caused by the rotation of the impeller 11 is increased, resulting in a further improvement in the cooling performance.

The motor portion 12 includes a thrust dynamic pressure bearing portion (not shown) in which the lubricating oil is present, the thrust dynamic pressure bearing portion being defined in a thrust gap (not shown) defined between axially opposed surfaces of the bearing portion 23 and a thrust portion (not shown). The axial width of the thrust gap is arranged to be 70 μm or less than 70 μm. Transfer of heat from the sleeve 231 to the shaft 221 is facilitated by defining the thrust gap (not shown) which is a minute gap. Thus, more heat is transferred from the heat source 30 to the impeller 11, and the effect of heat dissipation caused by the rotation of the impeller 11 is increased, resulting in a further improvement in the cooling performance. More specifically, the axial width of the first thrust gap 34 is arranged be 70 μm or less than 70 μm. Note that, although the thrust portion (not shown) is the first thrust portion 222d in the present preferred embodiment, the thrust portion may be the second thrust portion 224. Also note that, although the thrust gap (not shown) is the first thrust gap 34 in the present preferred embodiment, the thrust gap may be the second thrust gap 32. More preferably, the axial width of the thrust gap (not shown) is arranged to be 45 μm or less than 45 μm.

Referring to FIG. 2, the radial width of the minute gap 231d is arranged to be 0.15 mm or less than 0.15 mm. More preferably, the radial width of the minute gap 231d is arranged to be 0.10 mm or less than 0.10 mm. The small width of the radial gap between the outer circumferential surface of the rotor cylindrical portion 222b and the inner circumferential surface of the rising upper tubular portion 1321a enables a heat to be transferred from the lower plate portion 132 to the impeller 11 through the minute gap between the rotating portion 22 and the stationary portion 21. Thus, more heat is transferred from the heat source 30 to the impeller 11, and the effect of heat dissipation caused by the rotation of the impeller 11 is increased, resulting in a further improvement in the cooling performance.

Figure 8:
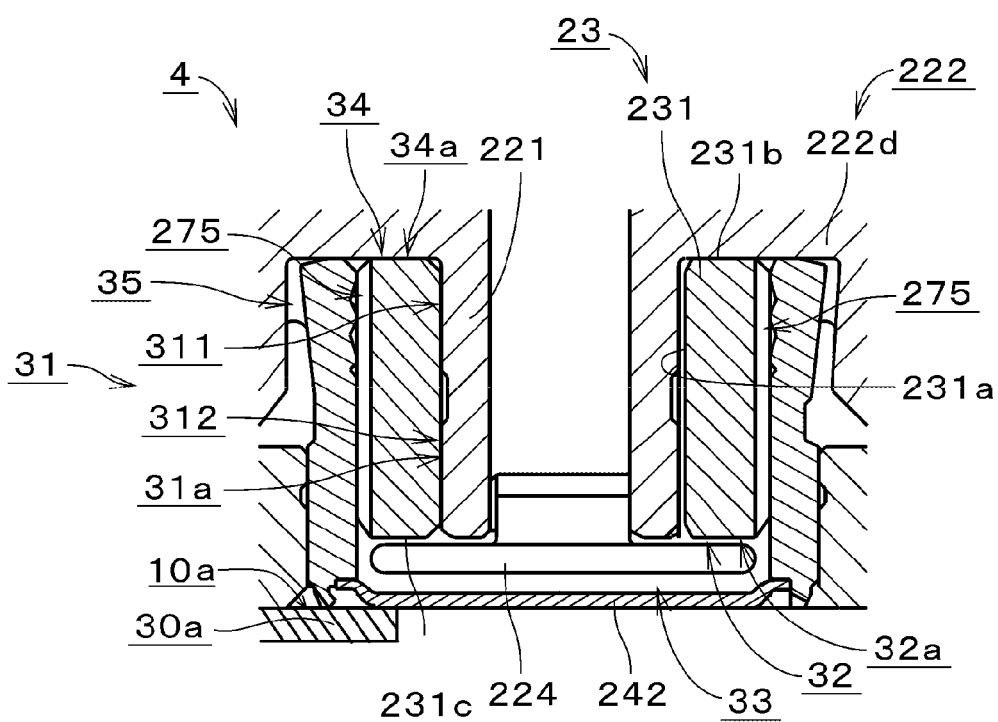
FIG. 8 is a cross-sectional view of a portion of a blower fan according to an example modification of the first preferred embodiment, illustrating a bearing portion and its vicinity.

FIG. 8 is a cross-sectional view of a blower fan according to an example modification of the above-described preferred embodiment, illustrating a bearing portion 23 and its vicinity. As illustrated in FIG. 8, at least a portion of a heat source contact portion 10a may be arranged in the bearing portion 23. More specifically, at least a portion of a heat source 30a may be arranged on a lower surface of a cap 242 and/or a lower surface of a housing cylindrical portion 241. Arrangement of at least a portion of the heat source 30a on at least a portion of the bearing portion 23 makes it easier for a heat to be transferred from the bearing portion 23 to a lower plate portion 132. The heat transferred to the lower plate portion 132 is then dissipated through rotation of the blower fan 1, and thus, an improvement in cooling performance is achieved.

Figure 9:
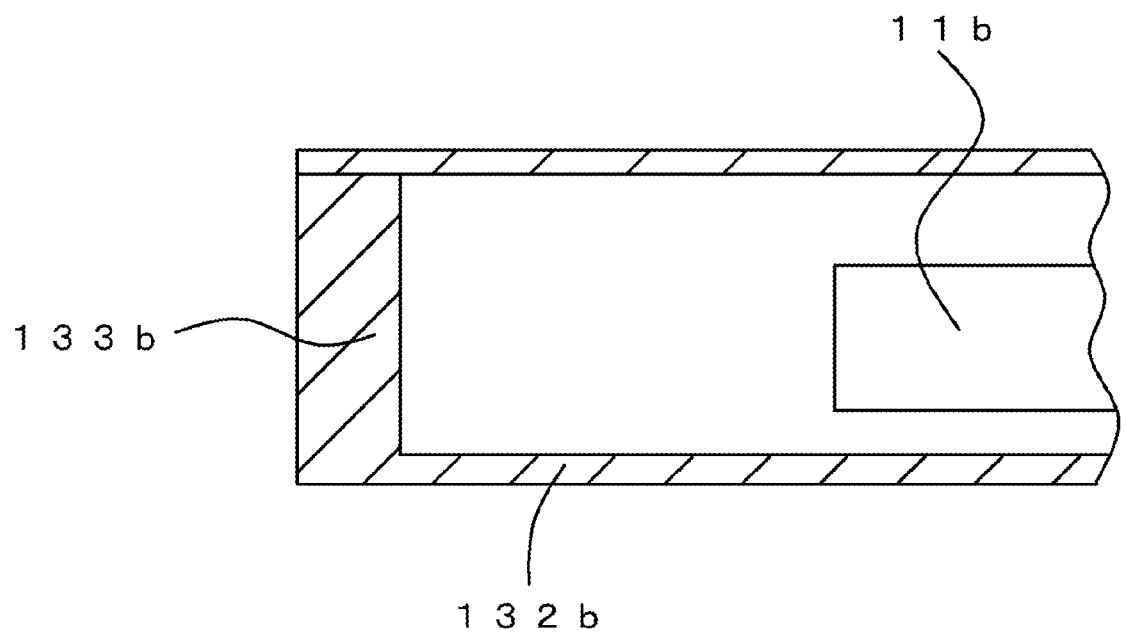
FIG. 9 is a cross-sectional view of a portion of a blower fan according to another example modification of the first preferred embodiment, illustrating a lower plate portion and its vicinity.

FIG. 9 is a cross-sectional view of a blower fan according to another example modification of the above-described preferred embodiment, illustrating a lower plate portion 132b and its vicinity. The basic structure of the blower fan according to the present example modification is similar to that of the blower fan 1 according to the above-described preferred embodiment. According to the present example modification, the lower plate portion 132b and a side wall portion 133b are defined by a single member. When the lower plate portion 132b and the side wall portion 133b are defined by the single member, a heat dissipated from a heat source (not shown) is more efficiently transferred to both the lower plate portion 132b and the side wall portion 133b. The flow velocity of an air current is high at a radially outermost end of the lower plate portion 132b and an inner circumferential surface of the side wall portion 133b, and heat in surfaces of the lower plate portion 132b and the side wall portion 133b can be efficiently discharged by winds caused by an impeller 11b striking the radially outermost end of the lower plate portion 132b and the inner circumferential surface of the side wall portion 133b.

Note that the lower plate portion 132b and the side wall portion 133b may be made of a heat conductive resin and a metal, respectively, and the lower plate portion 132b and the side wall portion 133b may be integrally defined by an insert molding process. When the lower plate portion 132b is made of the resin, the lower plate portion 132b can be arranged to have a complicated shape, and a reduction in a production cost is achieved.

Figure 10:
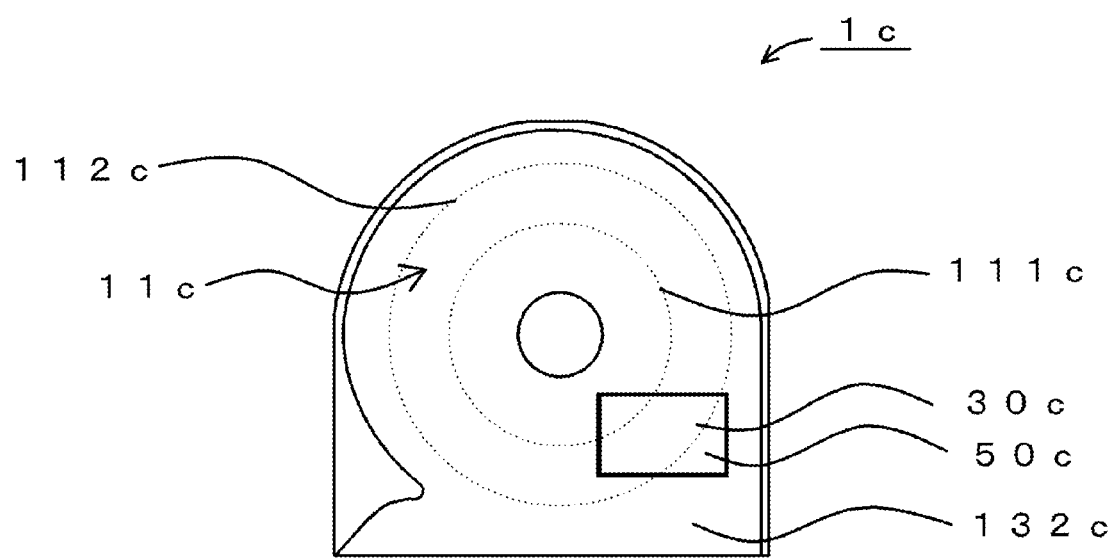
FIG. 10 is a bottom view of a lower plate portion of a blower fan according to yet another example modification of the first preferred embodiment.

FIG. 10 is a bottom view of a lower plate portion 132c of a blower fan 1c according to yet another example modification of the above-described preferred embodiment. The basic structure of the blower fan 1c according to the present example modification is similar to that of the blower fan 1 according to the above-described preferred embodiment. The lower plate portion 132c includes, in a lower surface thereof, a heat source accommodating portion 50c arranged to accommodate a heat source 30c. Inclusion of the heat source accommodating portion 50c in the lower plate portion 132c facilitates positioning of the heat source 30c and the blower fan 1c relative to each other. Note that, although the heat source accommodating portion 50c is defined by a portion of the lower surface of the lower plate portion 132c being recessed axially upward in the present example modification, this is not essential to the present invention. For example, a portion of the lower plate portion 132c, which is defined in the shape of a plate, may be arranged to project axially upward to define the heat source accommodating portion 50c. Note that at least a portion of the heat source accommodating portion 50c is preferably arranged in a region between outer circumferential ends of a plurality of blades 112c and an outer circumferential end of a blade support portion 111c. When at least a portion of the heat source accommodating portion 50c is arranged in the region between the outer circumferential ends of the blades 112c and the outer circumferential end of the blade support portion 111c, an air sucked through an air inlet 151 passes between adjacent ones of the blades 112c of the impeller 11c toward the lower plate portion 132c. When the heat source 30c is arranged under the blades 112c, a wind strikes a heat source contact portion 10c to improve cooling performance. Note that, in FIG. 10, the blades 112c and the blade support portion 111c are represented by imaginary lines.

Note that the blower fan 1 may be modified in a variety of manners.

Note that the blades 112 may not necessarily be arranged at regular intervals but may be arranged at irregular intervals. Also note that two or more channels having mutually different circumferential widths may be provided.

Note that motors according to preferred embodiments of the present invention may be either of a rotating-shaft type or of a fixed-shaft type. Also note that motors according to preferred embodiments of the present invention may be either of the outer-rotor type or of an inner-rotor type.

Note that, in the bearing mechanism 4, only at least one of the upper and lower thrust dynamic pressure bearing portions may be defined without any radial dynamic pressure bearing portion being defined.

Note that the bearing housing 232 may not necessarily be defined by a single member. For example, the bearing housing 232 being substantially cylindrical and having the bottom may be made up of a substantially cylindrical "housing cylindrical portion" centered on the central axis J1 and a substantially disk-shaped cap 242 fixed to a lower end portion of the housing cylindrical portion. In this case, the housing cylindrical portion is arranged to cover the outer circumferential surface of the sleeve 231, while the cap 242 is arranged to cover the lower surface of the sleeve 231. Also note that the bearing portion 23 may not necessarily be made up of the bearing housing 232 and the sleeve 231 inserted therein, but may be defined by a single member.

Note that the lower plate portion 132 and the rising portion 1321 may be defined by separate members. In this case, an outer circumferential surface of the rising portion 1321 is fixed to a hole portion of the lower plate portion 132. The rising portion 1321 is produced by subjecting a metallic member to a cutting process. Note that the rising portion 1321 may be made of a nonmetallic material. For example, the rising portion 1321 may be made of a heat conductive resin.

Note that, in the blower fan 1, the air inlet 151 may be defined in only one of the upper and lower plate portions 131 and 132. In other words, regarding the blower fan 1, it is enough that the upper plate portion 131 or the lower plate portion 132 should include the air inlet 151. Also note that, in the blower fan 1, the upper plate portion 131 may be omitted from the housing 13. In this case, the upper end portion of the side wall portion 133 is fixed to a case of the notebook PC in which the blower fan 1 is installed, and the upper side of the impeller 11 is covered with this case. That is, a portion of the case of the notebook PC is arranged to define the upper plate portion 131. In other words, the case of the notebook PC includes a top plate arranged to cover an upper side of the blower fan 1 as a substitute for the upper plate portion 131 of the blower fan 1, a side plate arranged on a lateral side of the blower fan 1, and a bottom plate arranged below the blower fan 1, and the top plate includes the air inlet 151. An electronic device including the blower fan 1 as described above is able to efficiently reduce heat generated from the heat source 30 so that performance of the electronic device can be maintained and a long life of the electronic device can be achieved.

Blower fans according to preferred embodiments of the present invention are usable to cool devices inside cases of notebook PCs and desktop PCs, to cool other devices, to supply an air to a variety of objects, and so on. Moreover, blower fans according to preferred embodiments of the present invention are also usable for other purposes.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention and modifications thereof have been described above, it is to be understood that additional variations and modifications will be apparent to those skilled in the art without departing from the scope and spirit of the present invention. The scope of the present invention, therefore, is to be determined solely by the following claims.

What is claimed is:

1. A blower fan comprising:
an impeller including a plurality of blades arranged to rotate about a central axis extending in a vertical direction and arranged in a circumferential direction, and an annular blade support portion arranged to support the blades;
a motor portion arranged to rotate the impeller; and
a housing arranged to contain the impeller; wherein
the housing includes:
a lower plate portion arranged to cover a lower side of the impeller, and arranged to support the motor portion;
a side wall portion arranged to cover a lateral side of the impeller, and including at least one opening each of which opens into an exterior space outside the blower fan, each of the at least one opening extending over a circumferential extent; and
an upper plate portion arranged to cover an upper side of the impeller, and including an air inlet;
the upper plate portion, the side wall portion, and the lower plate portion are arranged to together define an air outlet on the lateral side of the impeller;
a space joining a space above the impeller and a space between the impeller and the lower plate portion to each other in an axial direction is defined between adjacent ones of the blades of the impeller;
the blower fan further comprises a heat source contact portion with which a heat source is to be in contact, the heat source contact portion being arranged in a surface of the blower fan which faces away from the impeller;
the air outlet is a plane parallel to the central axis, and including one of an edge of the upper plate portion, a pair of edges which are circumferential ends of the opening of the side wall portion, and an edge of the lower plate portion that is the closest to the central axis;
the side wall portion includes a tongue portion arranged to project between the air outlet and the impeller;
when an imaginary straight line which is parallel to the air outlet and which intersects with the central axis in a plan view is defined as a first imaginary straight line, and an imaginary straight line which is perpendicular to the air outlet and which intersects with the central axis in the plan view is defined as a second imaginary straight line;
of four regions divided by the first and second imaginary straight lines, a region in which the tongue portion is arranged is defined as a first region, and the three other regions are defined as a second region, a third region, and a fourth region in an order in which the three regions are arranged in a rotation direction of the impeller from the first region;
an imaginary straight line which is tangent to an outer circumferential surface of the blade support portion and which extends in parallel with the second imaginary straight line toward the air outlet in the first region is defined as a third imaginary straight line; and
an imaginary straight line which is tangent to the outer circumferential surface of the blade support portion and which extends in parallel with the first imaginary straight line in the third region is defined as a fourth imaginary straight line;
at least a portion of the air outlet is arranged in the fourth region; and
the heat source contact portion is arranged to cover a portion of a region surrounded by the third imaginary straight line, the fourth imaginary straight line, the outer circumferential surface of the blade support portion, and the air outlet.

2. The blower fan according to claim 1, wherein each of the lower plate portion and the side wall portion is made of a material having a thermal conductivity of 1.0 W/(m·K) or more.

3. The blower fan according to claim 1, wherein a portion of the tongue portion that is the closest to the second imaginary straight line is arranged on an opposite side of the third imaginary straight line with respect to the second imaginary straight line.

4. The blower fan according to claim 1, wherein
the motor portion includes:
a bearing portion being substantially cylindrical and having a bottom; and
a shaft inserted in the bearing portion, and arranged to rotate about the central axis relative to the bearing portion; and
a portion of the heat source contact portion is arranged in the bearing portion.

5. The blower fan according to claim 4, wherein
a radial dynamic pressure bearing portion in which a lubricating oil is present is defined in a radial gap defined between the bearing portion and the shaft; and
the radial gap is arranged to have a radial width of 5 µm or less than 5 µm.

6. The blower fan according to claim 5, wherein the radial dynamic pressure bearing portion is arranged to have an axial dimension equal to or greater than half an axial dimension of a region over which the shaft is arranged inside the bearing portion.

7. The blower fan according to claim 4, further comprising an annular thrust portion arranged around the shaft, and arranged axially opposite the bearing portion, wherein
a thrust dynamic pressure bearing portion in which a lubricating oil is present is defined in a thrust gap defined between axially opposed surfaces of the bearing portion and the thrust portion; and
the thrust gap is arranged to have an axial width of 70 µm or less than 70 µm.

8. The blower fan according to claim 4, wherein
the motor portion further includes a rotor holder substantially in a shape of a covered cylinder;
the rotor holder includes a first thrust portion arranged to extend radially outward from an upper end of the shaft, and an annular tubular portion being substantially annular, and arranged to extend downward from an outer edge portion of the first thrust portion;
the lower plate portion includes a substantially cylindrical rising portion including a hole defined by an inner circumferential surface thereof and to which the bearing portion is fixed;
the rising portion includes a rising upper tubular portion arranged to project upward at an upper end thereof;
an outer circumferential surface of the annular tubular portion is arranged opposite to an inner circumferential surface of the rising upper tubular portion with a radial gap intervening therebetween; and
the radial gap is arranged to have a width of 0.15 mm or less than 0.15 mm.

9. The blower fan according to claim 4, wherein each of the impeller, the bearing portion, and the shaft is made of a material having a thermal conductivity of 1.0 W/(m·K) or more.

10. The blower fan according to claim 9, wherein
a radial dynamic pressure bearing portion in which a lubricating oil is present is defined in a radial gap defined between the bearing portion and the shaft; and
the radial gap is arranged to have a radial width of 5 μm or less than 5 μm.

11. The blower fan according to claim 10, wherein the radial dynamic pressure bearing portion is arranged to have an axial dimension equal to or greater than half an axial dimension of a region over which the shaft is arranged inside the bearing portion.

12. The blower fan according to claim 9, further comprising an annular thrust portion arranged around the shaft, and arranged axially opposite the bearing portion, wherein
a thrust dynamic pressure bearing portion in which a lubricating oil is present is defined in a thrust gap defined between axially opposed surfaces of the bearing portion and the thrust portion; and
the thrust gap is arranged to have an axial width of 70 μm or less than 70 μm.

13. The blower fan according to claim 9, wherein
the motor portion further includes a rotor holder substantially in a shape of a covered cylinder;
the rotor holder includes a first thrust portion arranged to extend radially outward from an upper end of the shaft, and an annular tubular portion being substantially annular, and arranged to extend downward from an outer edge portion of the first thrust portion;
the lower plate portion includes a substantially cylindrical rising portion including a hole defined by an inner circumferential surface thereof and to which the bearing portion is fixed;
the rising portion includes a rising upper tubular portion arranged to project upward at an upper end thereof;
an outer circumferential surface of the annular tubular portion is arranged opposite to an inner circumferential surface of the rising upper tubular portion with a radial gap intervening therebetween; and
the radial gap is arranged to have a width of 0.15 mm or less than 0.15 mm.

14. The blower fan according to claim 1, wherein the heat source contact portion and the fourth region are arranged to at least partially overlap with each other in the plan view.

15. The blower fan according to claim 1, wherein, in the plan view, at least a portion of the heat source contact portion is arranged in a region radially inside an outer end of the blade support portion.

16. The blower fan according to claim 15, wherein, in the plan view, at least a portion of the heat source contact portion is arranged in a region radially inside outer ends of the blades and radially outside the outer end of the blade support portion.

17. The blower fan according to claim 1, wherein the lower plate portion and the side wall portion are defined integrally with each other.

18. The blower fan according to claim 1, wherein the lower plate portion includes a heat source accommodating portion arranged to accommodate the heat source.

19. An electronic device comprising:
a case; and
the blower fan of claim 1; wherein
the case includes:
a top plate arranged to cover an upper side of the blower fan as a substitute for the upper plate portion of the blower fan;
a side plate arranged on a lateral side of the blower fan; and
a bottom plate arranged below the blower fan; and
the top plate includes the air inlet.

* * * * *